(12) United States Patent
Daeubler et al.

(10) Patent No.: US 9,303,522 B2
(45) Date of Patent: Apr. 5, 2016

(54) METHOD OF REPAIRING RUN-IN COATINGS

(75) Inventors: Manfred A. Daeubler, Dachau (DE); Horst Mueller-Wittek, legal representative, Gelsenkirchen (DE); Renate Mendritzki, legal representative, Gelsenkirchen (DE); André Werner, Munich (DE); Heinrich Walter, Friedberg (DE)

(73) Assignee: MTU Aero Engines GmbH, Munich (DE)

( * ) Notice: Subject to any disclaimer, the term of this patent is extended or adjusted under 35 U.S.C. 154(b) by 1356 days.

(21) Appl. No.: 12/308,523

(22) PCT Filed: Jun. 14, 2007

(86) PCT No.: PCT/DE2007/001052
§ 371 (c)(1),
(2), (4) Date: Aug. 30, 2010

(87) PCT Pub. No.: WO2007/147387
PCT Pub. Date: Dec. 27, 2007

(65) Prior Publication Data
US 2010/0330271 A1 Dec. 30, 2010

(30) Foreign Application Priority Data
Jun. 20, 2006 (DE) .......................... 10 2006 028 297

(51) Int. Cl.
| | |
|---|---|
| *B05D 3/00* | (2006.01) |
| *B32B 43/00* | (2006.01) |
| *F01D 11/12* | (2006.01) |
| *B23P 6/00* | (2006.01) |
| *C23C 10/16* | (2006.01) |
| *C23C 10/18* | (2006.01) |
| *C23C 26/00* | (2006.01) |

(52) U.S. Cl.
CPC .................. *F01D 11/12* (2013.01); *B23P 6/007* (2013.01); *C23C 10/16* (2013.01); *C23C 10/18* (2013.01); *C23C 26/00* (2013.01); *F05C 2201/0463* (2013.01); *F05C 2201/0466* (2013.01);
(Continued)

(58) Field of Classification Search
CPC ......... F01D 11/12; B23P 6/007; C23C 10/16; C23C 10/18; C23C 26/00
USPC .................................................. 427/140, 142
See application file for complete search history.

(56) References Cited

U.S. PATENT DOCUMENTS

| | | | | |
|---|---|---|---|---|
| 3,053,694 A | * | 9/1962 | Daunt et al. | 427/230 |
| 3,817,719 A | * | 6/1974 | Schilke et al. | 75/231 |

(Continued)

FOREIGN PATENT DOCUMENTS

| | | | | |
|---|---|---|---|---|
| CA | 2 547 530 | 6/2006 | ................ | C23C 4/06 |
| DE | 198 27 620 | 12/1999 | .............. | C23F 17/00 |

(Continued)

*Primary Examiner* — Michael Wieczorek
(74) *Attorney, Agent, or Firm* — Davidson, Davidson & Kappel, LLC

(57) ABSTRACT

A method for repairing run-in coatings is provided. The method includes the steps of filling a damaged site of the run-in coating with a filling material having a material composition that corresponds to a material composition of the run-in coating or is comparable to the material composition of the run-in coating or having material properties that are comparable to material properties of the run-in coating; drying the filling material that has been filled into the damaged site; depositing a donor diffusion layer over an area of the damaged site and onto the dried filling material; and thermally treating the run-in coating at least in the area of the damaged site to locally diffuse at least one metallic element from the donor diffusion layer into the filling material.

1 Claim, 1 Drawing Sheet

(52) U.S. Cl.
CPC ....... *F05D2220/762* (2013.01); *F05D 2230/10* (2013.01); *F05D 2230/22* (2013.01); *F05D 2230/30* (2013.01); *F05D 2230/40* (2013.01); *F05D 2230/80* (2013.01); *F05D 2300/11* (2013.01); *F05D 2300/224* (2013.01); *F05D 2300/228* (2013.01)

(56) References Cited

U.S. PATENT DOCUMENTS

| | | | | |
|---|---|---|---|---|
| 4,409,054 | A | * | 10/1983 | Ryan .............................. 156/293 |
| 5,326,647 | A | * | 7/1994 | Merz et al. .................... 428/605 |
| 2003/0072879 | A1 | * | 4/2003 | Fournes et al. ................ 427/250 |
| 2005/0095358 | A1 | * | 5/2005 | Park et al. ..................... 427/140 |
| 2006/0131815 | A1 | | 6/2006 | Meier .................... F16J 15/447 |
| 2007/0272331 | A1 | | 11/2007 | Strasser et al. .......... C23C 10/04 |

FOREIGN PATENT DOCUMENTS

| | | | |
|---|---|---|---|
| EP | 0 837 153 | 4/1998 | ............. C23C 10/04 |
| EP | 0 984 074 | 3/2000 | ............. C23C 10/32 |
| GB | 2 401 117 | 11/2004 | ............. C23C 10/04 |
| WO | WO 2004/061340 | 7/2004 | ............. F16J 15/44 |
| WO | WO 2005/035819 | 4/2005 | ............. C23C 10/04 |
| WO | WO 2005/056878 | 6/2005 | ............. C23C 30/00 |

\* cited by examiner

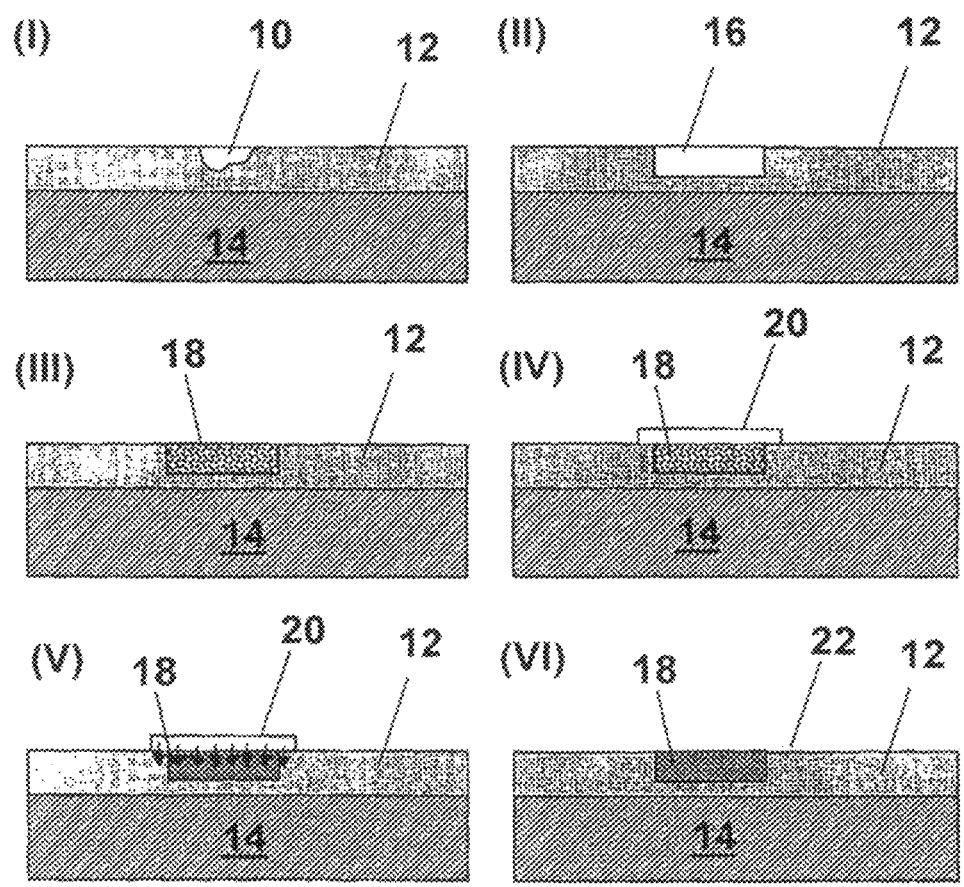

METHOD OF REPAIRING RUN-IN COATINGS

This is a national phase of International Application No. PCT/DE2007/001052, filed Jun. 14, 2007, which claims priority to German Patent Application DE 10 2006 028 297.3, filed Jun. 20, 2006, the entire disclosure of which is hereby incorporated by reference herein.

The present invention relates to a method for repairing run-in coatings, in particular run-in coatings for use in compressor and turbine components.

BACKGROUND

Run-in coatings are used, in particular, when working with what are generally referred to as gap-maintaining systems in compressor and turbine components. In this context, the run-in coatings have the function of maintaining a minimal sealing gap between rotating blading and a housing, as well as between stationary blading and the rotating rotor hubs, and of thereby ensuring stable operating characteristics in the context of a highest possible efficiency. The rotating components of the turbine typically have sealing fins which run in against the run-in coatings or seals in a manner known per se. A honeycomb seal of this kind is described by World Patent Application WO 2004/061340 A1. However, the mentioned running-in process can lead to damage to the run-in coating in such a way that no uniform ablation of the run-in coating, respectively of the seal takes place, but rather that local damage occurs in the form of irregularly shaped and relatively deep sections broken out of the run-in coating.

However, in aircraft engines and gas turbines, a crucial factor influencing the efficiency and reliability of the system is the maintaining of a gap between a rotor and a stator. As operating time increases, a degradation, i.e., an enlargement of the gap between the rotor and the compressor housing, resulting from the mentioned local damage, for example, negatively affects both the efficiency, as well as the surge limit of the compressor.

Under known methods heretofore, such damage to the run-in coating necessitates removing the entire run-in coating and subsequently replacing the same. This disadvantageously entails substantial costs.

SUMMARY OF THE INVENTION

It is, therefore, an object of the present invention to devise a method which will make it possible to repair run-in coatings, in particular run-in coatings for use in compressor and turbine components, in an inexpensive and simple process.

This objective is achieved by a method according to an embodiment of the present invention.

A method according to the present invention for repairing run-in coatings, in particular run-in coatings for use in compressor and turbine components, includes the following method steps: a) filling a damaged site of the run-in coating with a material whose material composition corresponds to that of the run-in coating or is comparable thereto or whose material properties are comparable to the material properties of the run-in coating; b) drying the material that has been filled into the damaged site; c) depositing a donor diffusion layer over the area of the damaged site and onto the filled-in material; and d) thermally treating the run-in coating at least in the area of the damaged site to locally diffuse at least one metallic element from the donor diffusion layer into the filled-in material. For the first time, a method for repairing run-in coatings is devised by the present invention which makes it possible to repair locally limited damage to the run-in coating. Since local damage of this kind no longer necessitates removing the entire run-in coating, the method according to the present invention provides a simple and cost-effective approach for repairing damaged run-in coatings. Of considerable importance in this context is that the material to be introduced into the damaged site corresponds in its material composition to that of the run-in coating or is comparable thereto, or its material properties are at least comparable to the material properties of the run-in coating. The material employed by the method according to the present invention may be in the form of slip agent, paste or tape. The material is typically composed of a metallic powder provided with a binding agent, the metallic powder being produced on a Ni-, Co- and/or Fe base. Other metallic compositions are likewise conceivable. Polyvinyl alcohol, polyvinyl acetate, cellulose ester and/or acryl dispersions may be selected as binding agent for the material. Moreover, the material may possibly contain ceramic constituents, such as graphite, hexagonal boron nitride and/or bentonite, for example. In accordance with method step c), the donor diffusion layer may also be deposited on the regions of the run-in coating that adjoin the damaged site. This produces an intimate bond between the repair material and the run-in coating.

One advantageous embodiment of the method according to the present invention provides for the damaged site to be machined prior to method step a) in such a way that a repair site having a defined shape and size is formed. Forming a defined repair site makes it possible to precisely calculate the requisite quantity of repair material. Moreover, defined transitions between the repair site and the undamaged regions of the run-in coating are advantageously produced.

One advantageous embodiment of the method according to the present invention provides for the material to be first hardened in method step b) at temperatures ranging from room temperature up to 450° C. The donor diffusion layer deposited onto the repair site, respectively onto the material filled into the repair site is typically of the foil or lacquer type or is in the form of slip agent or paste. In this context, in accordance with the present invention, the donor diffusion layer contains metallic powder, in particular Al- and/or Cr-containing powder. Also conceivable are other metallic powder compositions. Typically, the metallic powder has a particle-size distribution of 1 to 120 µm. Besides the mentioned donors, the donor diffusion layer also contains at least one activating agent selected from the group including $NH_4F$, $NH_4CL$, $AlF_3$, $MgF_2$, $CrCl_2$, $CrCl_3$, LiF, phosphorus salt and chromic acid salt. In addition, the donor diffusion layer has at least one binding agent selected from the group that includes polyvinyl alcohol, polyvinyl acetate, cellulose ester and acryl dispersions. As solvent, the donor diffusion layer typically contains water, alcohol and/or ether.

In accordance with the present invention, a second hardening of the material follows in response to the thermal treatment carried out in method step d). The thermal treatment takes place at temperatures of between 500° C. and 1250° C. If the donor diffusion layer contains Al-containing powder, the repair material is advantageously alitized, thereby achieving the known advantages with respect to hardness, temperature resistance, corrosion resistance and oxidation resistance.

In another advantageous embodiment of the present invention, the repaired site of the run-in coating is postworked and evened out following method step d). This ensures that irregularities in the surface relative to the surface of the surrounding, undamaged run-in coating caused by a possible overhang of repair material or donor diffusion layer residues do not result at the repaired site. Conventional methods, such as turning on a lathe or abrasive polishing, however, not including grinding, may be used for the mentioned postmachining processes.

Other advantages and features of the present invention and details pertaining thereto are derived from the following description of a graphically illustrated exemplary embodiment.

BRIEF DESCRIPTION OF THE DRAWING

The present invention is described below by reference to the following drawing, in which:

The FIGURE shows schematically the sequence of operations which leads to a repair of a damaged site of a run-in coating.

DETAILED DESCRIPTION

The FIGURE shows schematically the sequence of operations which leads to a repair of a damaged site 10 of a run-in coating 12. The initial situation is shown under (I). It is discernible that run-in coating 12 is applied to a base material 14, base material 14 being a compressor housing or a turbine housing. In a first method step, the irregular damage to run-in coating 12 that occurred in (I) is machined in such a way that a repair site 16 having a defined shape and size results (see (II)). As illustrated under (III), damaged site 10, respectively defined repair site 16 of run-in coating 12 is subsequently filled with a material 18. The material composition of material 18 corresponds to that of run-in coating 12 or is at least comparable thereto. In the illustrated exemplary embodiment, a slip agent, composed of a binding agent and a metallic powder, is applied as material 18 using a brush or a spray gun. A green compact is formed by properly drying filled-in material 18, the drying temperatures and drying times conforming to the particular material composition.

In a further method step (see (IV)), a donor diffusion layer 20 is deposited over the area of damaged site 10, respectively of defined repair site 16, and onto filled-in material 18. The deposited donor diffusion layer 20 is suited for the local diffusion coating of material 18, as well as of undamaged regions of run-in coating 12 surrounding repair site 10, 16. Thus, in the illustrated exemplary embodiment, donor diffusion layer 20 contains Al-containing powder as a donor. In response to the thermal treatment carried out under (V), at least one metallic element is locally diffused from donor diffusion layer 20 into material 18 and into regions of run-in coating 12 covered by donor diffusion layer 20 that adjoin repair site 10, 16. The green compact is subsequently cemented, respectively material 18, as well as the adjoining regions of run-in coating 12 are alitized by the use of the mentioned Al-containing powder. On the one hand, the inward diffusion of the metallic elements forms an intimate bond between material 18 and run-in coating 12, and, on the other hand, it achieves the requisite hardness properties, respectively temperature resistance, oxidation resistance and corrosion resistance for material 18.

Upon completion of the thermal treatment of run-in coating 12 in the area of damaged site 10, 16, a postmachining of the repair site follows, as illustrated under (VI), in such a way that possible irregularities of material 18 relative to surface 22 of run-in coating 12 are evened out, respectively corrected. Moreover, remaining residues of donor diffusion layer 20 may be removed.

What is claimed is:

1. A method for repairing run-in coatings comprising the steps of:
   filling a damaged site of a run-in coating with a filling material having a material composition that corresponds to a material composition of the run-in coating or is comparable to the material composition of the run-in coating or having material properties that are comparable to material properties of the run-in coating;
   drying the filling material that has been filled into the damaged site;
   depositing a donor diffusion layer over an area of the damaged site and onto the dried filling material;
   and thermally treating the run-in coating at least in the area of the damaged site to locally diffuse at least one metallic element from the donor diffusion layer into the filling material;
   the filling material including ceramic constituents selected from a group consisting of graphite, hexagonal boron nitride, and bentonite;
   wherein the filling material includes a metallic powder provided with a binding agent;
   wherein the metallic powder is produced on a Ni-, Co- and/or Fe base.

* * * * *